Dec. 7, 1948.  H. WINTHER  2,455,847
LUBRICATING SYSTEM FOR VEHICLES
Filed July 11, 1947  2 Sheets-Sheet 1
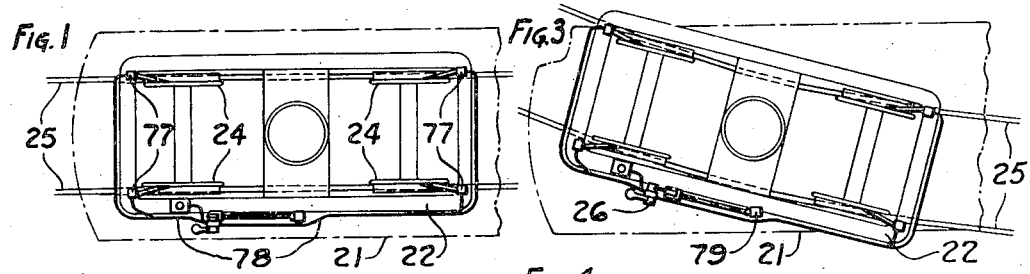
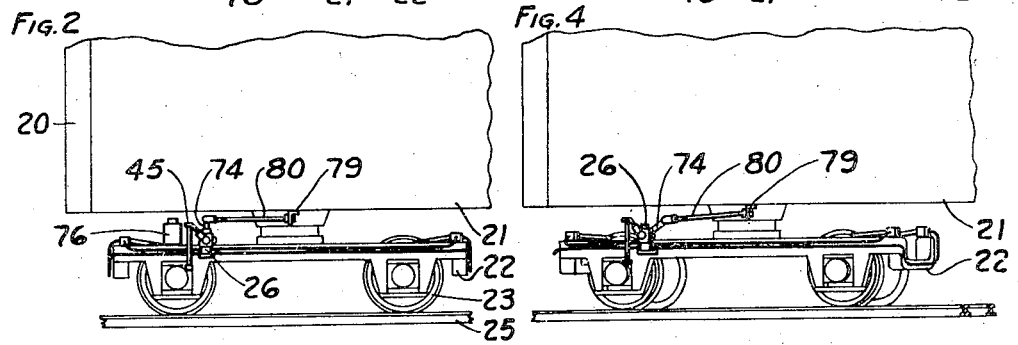
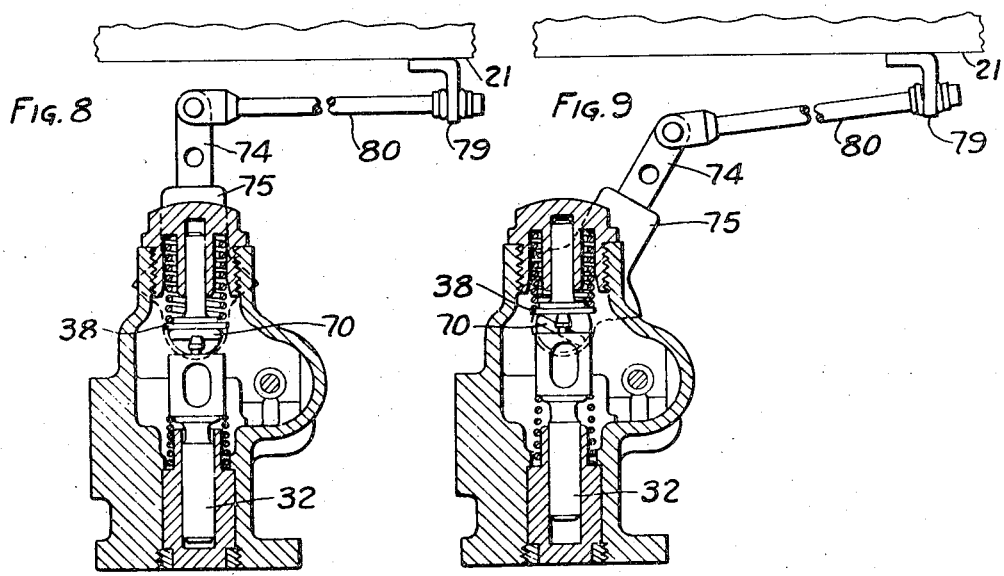
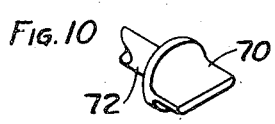
HOWARD WINTHER
INVENTOR.
BY Walter E. Wallheim
ATTORNEY.

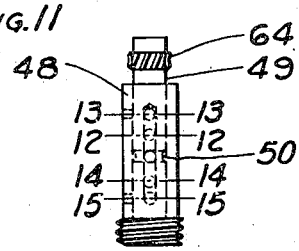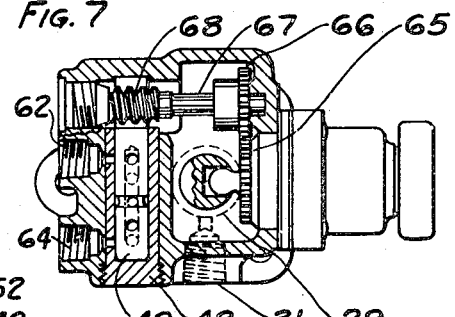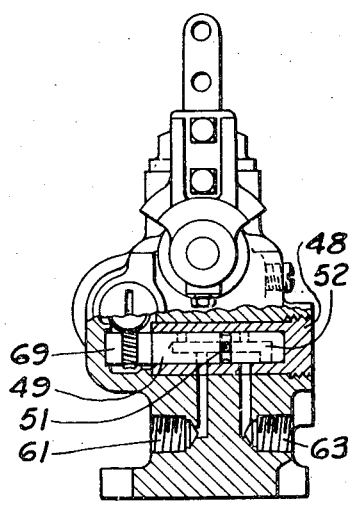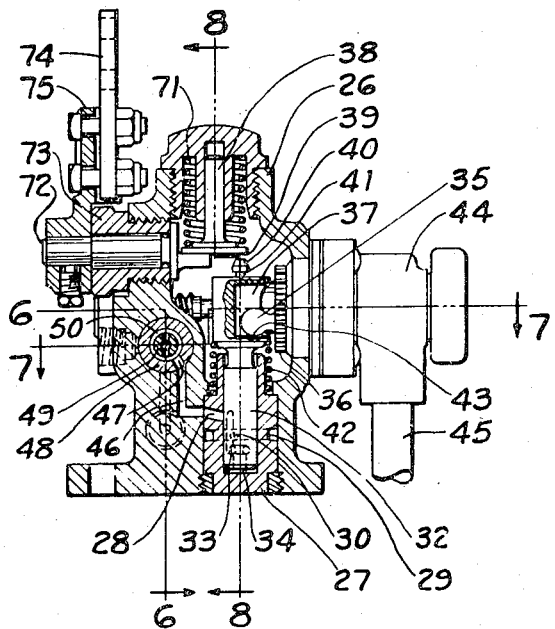

Patented Dec. 7, 1948

2,455,847

UNITED STATES PATENT OFFICE 2,455,847

LUBRICATING SYSTEM FOR VEHICLES

Howard Winther, Harrington Park, N. J., assignor to Nathan Manufacturing Company, New York, N. Y., a corporation of New York Application July 11, 1947, Serial No. 760,188

6 Claims. (Cl. 184—3)

This invention relates to pumps adapted to deliver oil to devices for lubricating the flanges of wheels of vehicles running on tracks, such as locomotives, railroad cars, etc., where the wheels are mounted on trucks or frames which move relatively to the main body of the vehicle which they support or for lubricating various points on a vehicle, not running on tracks, where relative movements are present between its body and its frame or support.

It is the principal object of this invention to provide in a pump of this type, means to deliver only a small quantity of oil to these lubricating devices while the vehicle is running on a straight track or making a straight run and to increase this quantity of oil while rounding a curve when more lubricant is needed.

Another object is to provide a pump which can deliver quantities of oil to a plurality of lubricating devices so that a single pump can take care of the lubricant requirements of an entire vehicle.

A further object is to make use of the movements of different points on the vehicle relative to each other to operate the pump, as well as automatically adjust the amount of oil discharged, so as to provide a self-contained and automatic lubricating system for the purpose specified.

Other objects will become apparent after a perusal of the following specification and an inspection of the accompanying drawings in which a preferred embodiment of the invention is described, respectively, shown.

In the drawings,

Fig. 1 is a plan view of a fragmentary part of a vehicle with its frame while running on a straight track;

Fig. 2 is a fragmentary elevational view of the same;

Fig. 3 is a plan view of the same while rounding a curve;

Fig. 4 is a fragmentary elevational view of the same;

Fig. 5 is a sectional view of the lubricating pump forming part of the system, partly in elevation;

Fig. 6 is a cross-sectional view along the plane of line 6—6 in Fig. 5;

Fig. 7 is an horizontal sectional view, partly in elevation, along the plane of line 7—7 in Fig. 5;

Fig. 8 is a cross-sectional view along the plane of line 8—8 in Fig. 5 showing the piston at its minimum stroke;

Fig. 9 is a sectional view, the same as Fig. 8 but showing the piston at its maximum stroke;

Fig. 10 is a fragmentary perspective view of a cam controlling the stroke of the piston;

Fig. 11 is a detail plan view of the distributing valve and bushing of the pump; and Figs. 12, 13, 14 and 15 are sectional views along, respectively, planes of lines 12—12, 13—13, 14—14, and 15—15 in Fig. 11 showing different relative positions between valve and bushing.

Like characters of reference denote similar parts throughout the several views and the following specification.

20 is a vehicle having a body 21 mounted movably upon a frame 22 within which are supported axles of wheels 23, preferably, within spring supported journal boxes, in the manner well known in the art. The wheels are provided with flanges 24 and ride upon a pair of tracks 25. Attention is drawn to the fact that the vehicle body is movable in relation to its frame, and that the wheels, respectively, their axles, are movable with respect to the frame.

Referring to Fig. 5, 26 is a pump housing into which is fitted a cylinder 27 provided with a discharge duct 28 and an outer annular groove 29 which connects an inlet duct 30 to an inlet 31 in the housing as shown in Fig. 7.

A piston 32 is fitted to cylinder 27 and is provided with ports 33 arranged to communicate with inlet duct 30 to admit fluid into a chamber 34 and to communicate alternately with duct 28 to discharge fluid from this chamber.

A reciprocating and oscillating movement is imparted to piston 32 by means of a ball pin 35 eccentrically disposed on an end of a ratchet shaft 36 and moving inside a slot of a crosshead 37 of piston 32. A stop member 38 limits the travel of the piston 32 by contact between its bottom surface 39 and a top 40 of an extension 41 to the piston 32 when the piston is in its top position. A spring 42 acting on the crosshead 37 maintains contact between the piston 32 and the ball pin 35 at a point 43 during its upward or suction stroke.

The ratchet shaft 36 is supported and driven by a ratchet mechanism 44 of the kind, for instance, described in Patent No. 2,406,599 of August 27, 1946. The ratchet mechanism is actuated by a connection between an arm 45 and a vibrating or oscillating part of the frame to which the lubricator is attached, such as the journal boxes of the wheel axles. A preferred method of a connection is disclosed in Patent No. 2,359,905 of October 10, 1944.

The fluid discharged into the duct 28 by the motion of the piston 32 passes through a duct 46 in the housing and flows to an opening 47 in a cylindrical valve bushing 48. A rotary valve 49 within the bushing 48 has an annular groove 50 which maintains contact with opening 47 during the entire revolution of valve 49. A radial channel 51 through the valve 49 transmits the fluid from the groove 50 to an axial chamber 52 in the valve.

Referring to Figs. 12, 13, 14 and 15, ports 53, 54, 55 and 56 in valve 49 serve to distribute the fluid from the chamber 52 consecutively to ports 57, 58, 59 and 60 in bushing 48 which communicate, respectively, with pump outlets 61, 62, 63 and 64.

In Fig. 7, teeth of a gear 65 on the ratchet shaft 36 engage teeth of a gear 66 which rotates a shaft 67 and a worm 68. Worm 68 rotates a gear 69 attached to valve 49.

The relation of revolutions of ratchet shaft 36 to those of valve 49 is such that, when the number of ports 53, 54, 55 and 56 is represented by $n$, the valve 49 will rotate $1/n$ revolution for each revolution of the ratchet shaft 36.

The train of gears 66, 68 and 65 is positioned so that one of the valve ports, such as 53 will be in communication with a bushing port such as 57 during the downward or discharge stroke of the piston 32. Each revolution of the ratchet shaft 36 moves a consecutive valve port into communication with the bushing port located in its radial plane. The different positions of valve ports with respect to bushing ports are shown in Figs. 12, 13, 14 and 15. With the valve 49 as shown in these figures, the external discharges take place during the consecutive registering between ports 53 and 57, ports 54 and 58, ports 55 and 59, and ports 56 and 60. The cycle is repeated as long as the ratchet shaft continues to rotate.

The volume of fluid discharged by the piston 32 is controlled by the position of the stop member 38. The stop member in its normal or lowest position allows the piston 32 to travel a fixed minimum stroke. An increase in stroke is caused by the upward movement of stop member 38 when a cam 70 is rotated in either direction. A spring 71 is provided to maintain the stop member in contact with cam 70 and to overbalance the force of spring 42. Cam 70 has an integral shaft 72 which oscillates in a bearing 73 when an external torque is applied by a lever 74 through an arm 75.

In a railway vehicle, for instance, certain operating parts such as wheel flanges wear to a degree which is proportional to the curvature of the track as well as to the distance traversed. This lubricating system supplies an increased amount of lubricant to the wearing parts not only when the vehicle is entering the curve but during the entire traversal of the curve. The method of obtaining the increased volume is explained with reference to Fig. 1, showing a plan view of the frame 22 rotatably attached to the body 21 of a railway vehicle, and Fig. 2, showing a side elevation of the same.

The frame 22 has attached to it apparatus for applying lubricant to the wheel flanges 24, including a lubricant reservoir 76, the pump 26 and flange oilers 77, such as disclosed, for example, in Patent No. 2,380,743, issued July 17, 1945, to Bengt E. Folke et al., and suitable pipes 78 for conducting the fluid from the reservoir to the lubricator and from the lubricator to the flange oilers.

An anchoring lug 79 is fixed to the body 21 of the vehicle. A rod 80, provided with limited universal motion at each end, serves to connect lever 74 to anchoring lug 79. The length of the rod is adjused so that when the vehicle is standing on a straight track the lever 74 and arm 75 are vertical, cam 70 is horizontal and stop member 38 is in its lowest position, thus regulating the lubricator to its minimum discharge.

When the vehicle enters a curve, as illustrated in Figs. 3 and 4, the frame 22 is displaced rotationally with respect to the body 21. This displacement alters the distance between the pump 26 and the anchoring lug 79. The rod 80 being of fixed length, lever 74 and arm 75 move to compensate for the change in distance between the parts they connect. This movement causes cam 70 to rotate, raising the stop member 38, thereby increasing the stroke of piston 32 and automatically increasing the discharge of lubricant Upon the return of the vehicle to a straight track, the parts revert to the position shown in Figs. 1, 2 and 8, readjusting the lubricant delivery to the normal requirements.

While I have referred to the system as adapted to lubricate wheel flanges, it is obvious, of course, that the system could be employed equally as well for the lubrication of other points of a vehicle, and the term used i. e. wheel flanges, should not be interpreted as restrictive in any sense. As stated before the system is equally as applicable to vehicles not running on tracks but in which relative movements between different points of vehicle body and its support can be obtained.

Moreover, while I have shown an oil reservoir separate from the pump, it can be made part of the pump housing, or an independent supply pump may be used to furnish oil to the pump of the system in which case the piston serves as a distributing means for the oil to the rotary distributor.

Many other changes and minor details of construction may be resorted to without departing from the principles or sacrificing any of the advantages of the invention as defined in the appended claims.

What I claim as new is:

1. In a system for lubricating the wheel flanges of a vehicle having wheels mounted in a frame supporting the vehicle body, devices adapted to discharge oil against the wheel flanges, a pump mounted upon the frame supplying oil to each of the devices, mechanism to operate the pump actuated by the relative movements of two points on the frame, and mechanism connecting a point on the frame and a point on the vehicle body with the pump to adjust the amount of oil discharged by the pump in proportion to the relative movement between the vehicle body and the frame.

2. In a system for lubricating the wheel flanges of a vehicle having wheels mounted in a frame supporting the vehicle body, devices adapted to discharge oil against the wheel flanges, a pump mounted upon the frame having an inlet, a plurality of outlets in communication with the devices, a cylinder, a piston within the cylinder, a shaft adapted to reciprocate the piston, operating mechanism for the shaft actuated by the relative movements of two points on the frame, distributing means within the pump to supply oil to the devices successively through each of the outlets in timed relation with the reciprocation of the piston, and mechanism connecting a point on the frame and a point on the vehicle body with the pump to adjust the reciprocatory stroke of the piston in proportion to the relative movement between vehicle body and frame.

3. In a system for lubricating the wheel flanges of a vehicle having wheels mounted in a frame supporting the vehicle body, devices adapted to discharge oil against the wheel flanges, a pump mounted upon the frame having an inlet, a plurality of outlets in communication with the devices, a cylinder, a piston within the cylinder, a shaft adapted to reciprocate the piston, operating mechanism for the shaft actuated by the relative movements of two points on the frame, a rotary distributor interposed between the cylinder and the plurality of outlets having ports communicating with the cylinder, gearing between the shaft and the distributor adapted to bring the ports in communication with the plurality of outlets in timed relation with the reciprocation of the piston, and mechanism connecting a point on the frame and a point on the vehicle body with the pump to adjust the reciprocatory stroke of the piston in proportion to the relative movement between vehicle body and frame.

4. In a system for lubricating the wheel flanges of a vehicle having wheels mounted in a frame supporting the vehicle body, devices adapted to discharge oil against the wheel flanges, a pump mounted upon the frame having an inlet, a plurality of outlets in communication with the devices, a cylinder, a piston within the cylinder, a shaft adapted to reciprocate the piston, operating mechanism for the shaft actuated by the relative movements of two points on the frame, a rotary distributor interposed between the cylinder and the plurality of outlets having ports communicating with the cylinder, gearing between the shaft and the distributor adapted to bring one of the ports in communication with one of the outlets during one reciprocation of the piston, and mechanism connecting a point on the frame and a point on the vehicle body with the pump to adjust the reciprocatory stroke of the piston in proportion to the relative movement between vehicle body and frame.

5. In a system for lubricating the wheel flanges of a vehicle having wheels mounted in a frame supporting the vehicle body, devices adapted to discharge oil against the wheel flanges, a pump mounted upon the frame having an inlet, a plurality of outlets in communication with the devices, a cylinder, a piston within the cylinder, a shaft adapted to reciprocate the piston, operating mechanism for the shaft actuated by the relative movements of two points on the frame, a rotary distributor interposed between the cylinder and the plurality of outlets having ports communicating with the cylinder, gearing between the shaft and the distributor adapted to rotate the distributor at a relation of 1 divided by the number of outlets, 1 being a cycle of reciprocation of the piston, to bring one of the ports in communication with one of the outlets during one reciprocation of the piston, and mechanism connecting a point on the frame and a point on the vehicle body with the pump to adjust the reciprocatory stroke of the piston in proportion to the relative movement between vehicle body and frame.

6. In a system for lubricating the wheel flanges of a vehicle having wheels mounted in a frame supporting the vehicle body, devices adapted to discharge oil against the wheel flanges, a pump mounted upon the frame having a reciprocatory piston supplying oil to each of the devices, means to regulate the reciprocatory stroke of the piston, and mechanism connecting a point on the frame and a point on the vehicle body with the regulating means to adjust the amount of oil discharged by the pump in proportion to the relative movement between the vehicle body and the frame.

HOWARD WINTHER.

REFERENCES CITED

The following references are of record in the file of this patent:

UNITED STATES PATENTS

| Number | Name | Date |
| --- | --- | --- |
| 1,295,211 | Riedler | Feb. 25, 1919 |
| 1,738,735 | Scoville | Dec. 10, 1929 |
| 1,823,157 | McGinnis | Sept. 15, 1931 |
| 1,877,848 | Gilliam | Sept. 20, 1932 |
| 2,306,013 | Caprez | Dec. 22, 1942 |

FOREIGN PATENTS

| Number | Country | Date |
| --- | --- | --- |
| 308,763 | Great Britain | Aug. 22, 1929 |
| 402,630 | Great Britain | Dec. 7, 1933 |